Figure 1:
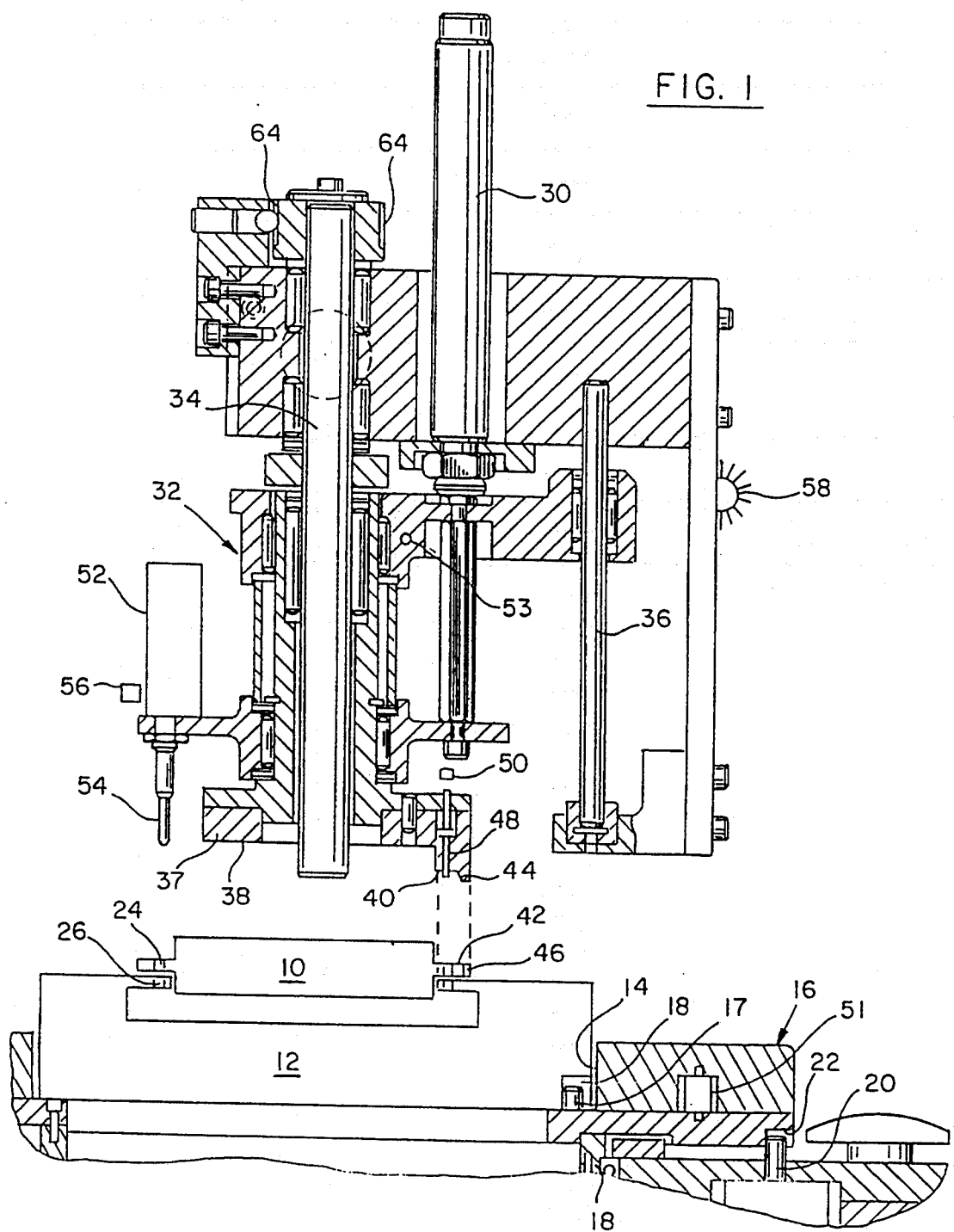

United States Patent [19]
Chitty et al.

[11] Patent Number: 5,438,742
[45] Date of Patent: Aug. 8, 1995

[54] APPARATUS FOR SETTING BLIND RIVETS

[75] Inventors: Eymard J. Chitty, Norwalk; Peter Diederich, Southbury, both of Conn.

[73] Assignee: Emhart Inc., Newark, Del.

[21] Appl. No.: 876,456

[22] Filed: Apr. 30, 1992

Related U.S. Application Data

[63] Continuation of Ser. No. 694,955, Apr. 30, 1991, abandoned.

[51] Int. Cl.6 .................. B23P 11/00; B23P 19/04
[52] U.S. Cl. .................... 29/243.54; 29/705; 29/818
[58] Field of Search .......... 29/34 B, 243.53, 243.54, 29/525.1, 525.2, 705, 706, 707, 787, 818; 207/51

[56] References Cited

U.S. PATENT DOCUMENTS

| | | | |
|---|---|---|---|
| 194,396 | 8/1877 | Allen | 29/243.54 |
| 1,340,361 | 5/1920 | Badenhausen | 29/243.54 |
| 1,375,395 | 4/1921 | Krook | 29/243.54 |
| 3,704,506 | 12/1972 | Orr et al. | 29/243.54 |
| 3,878,595 | 4/1975 | Boyle | 29/715 X |
| 4,312,107 | 1/1982 | White | 29/243.53 X |
| 4,858,289 | 8/1989 | Speller, Sr. | 29/243.53 |
| 4,885,836 | 12/1989 | Bonomi et al. | 29/525.2 X |

FOREIGN PATENT DOCUMENTS

| | | |
|---|---|---|
| 4002445 | 1/1990 | Germany . |
| 2246732 | 2/1992 | United Kingdom . |

Primary Examiner—Peter Vo
Attorney, Agent, or Firm—E. D. Murphy

[57] ABSTRACT

A plurality of blind rivets are to be set fastening together two components which are to define a laminate. The orientation of the bottom component is set to a desired orientation and the desired orientation of the top of the two components is verified prior to verification of the hole pairs which are to receive rivets prior to setting.

3 Claims, 2 Drawing Sheets

APPARATUS FOR SETTING BLIND RIVETS

This is a continuation of application Ser. No. 07/694,955 filed on Apr. 30, 1991 now abandoned.

The present invention relates to automatic blind riveting and more particularly to work clamping structures for clamping structure to be riveted by a blind riveting tool.

When layered parts are to be automatically blind riveted, it is important that through holes in adjacent layers are in fact aligned prior to riveting.

It is accordingly an object of the present invention to provide a clamping device which will assure that holes are properly aligned prior to riveting.

Other objects and advantages of the present present invention will become apparent from the following portion of this specification and from the accompanying drawings which illustrates in accordance with the mandate of the patent statutes a presently preferred embodiment incorporating the principles of the invention.

Figure 2:
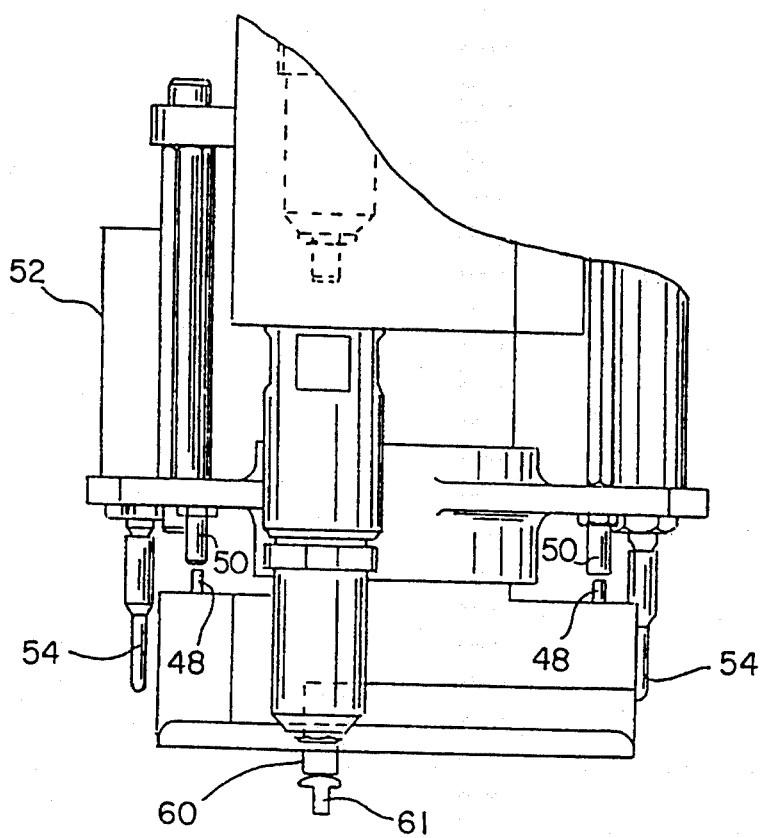

Referring to the drawings:

FIG. 1 is a front elevational cross-sectional view of a clamping assembly made in accordance with the teachings of the present invention;

and FIG. 2 is a rear view similar to FIG. 1.

A workpiece to be laminated, i.e. an inflator module 10 which is to be secured on an air bag assembly 12, is located within a suitable receiving opening 14 of a nest 16. The air bag assembly has a desired orientation relative to the nest and this is schematically represented by a nest location pin 17 suitably received by a location hole 18 in the air bag assembly. The nest is rotatably supported by bearings 18 and has a select start orientation which will be established by a table locating pin 20 which is introduced into a suitable nest locating hole 22.

The inflator module 10 will be fastened to the air bag assembly with blind rivets which will extend through aligned holes 24, 26 in the inflator module and the air bag assembly. Four pairs of holes 24, 26 located around the laminate will be riveted.

An operator places the laminate in the oriented nest and operates a push button (not shown). Pressure is removed from the pneumatic preload clamping cylinder 30 and the alignment and clamping assembly 32 freefalls down the main shaft 34 and the guide shaft 36 until the clamping plate 37 strikes the top of the inflator module. The clamping plate 37 has a flat clamping surface 38, a stepped portion 40 which matches an annular stepped portion 42 of the inflator module, and one or more locating protrusions 44.

If the inflator module is properly located these locating protrusions 44 will be received by locating notches 46 in the annular stepped portion 42 allowing the stepped portion 40 to bottom out on top of the annular stepped portion 42. This will cause the downwardly, biased contact detector plunger 48 to move upwardly and actuate a proximity switch 50. If this does not happen, the operator will manipulate the inflator module until the locating protrusions find the locating notches. The actuation of the proximity switch 50 operates two substantially diametrically opposed hole alignment pneumatic cylinders 52 to advance their hole alignment plungers 54 into two of these hole pairs. If the holes 24, 26 are in line and at the correct location, the plungers will pass through both holes to become fully advanced operating suitable proximity switches 56. If either alignment plunger strikes either the top surface of the annular stepped portion 42 or the top surface of the air bag assembly 12, the advance of the hole alignment plunger to its advanced 10 portion will lift the alignment and clamping assembly 32 upwardly away from the laminate. This will result in the return of the contact detector plunger 48 to its down position breaking its contact with the proximity switch 50 thereby discontinuing the cycle until the operator manipulates the laminate parts so that the hole alignment plungers will enter both holes. Horizontal compliance of nest misalignment of the main shaft/clamping plate centerline to the rotary table centerline is accommodated by compliant mounts 51.

When both switches 50, 56 are simultaneously operated, a light schematically shown as 58 will be illuminated informing the operator that he can now operate the preload clamping pneumatic cylinder 30 to forcefully urge the clamping preload plate 37 downwardly against the laminate to clamp the laminate. Proper seating of the rivet flange is assured by a proximity switch 53 (mounted on the alignment and clamping assembly) and a target (not shown) on the vertical slide containing the rivet tool. Due to the relative softness of the air bag module, the final elevation of surface 42 annular stepped portion of the inflator 10 is established after the align and clamping assembly 32 applies a preload compressive force. The hole alignment plungers 54 will be withdrawn and the operator will rotate the nest and hence the clamped laminate around the main shaft 34 sequentially to the detente locations 64 where the rivets 61 presented one, at a time by the nose 60 of a rivet setting tool which as shown is vertically displaceable from an elevated position to a rivet setting position. A positive clamp (not shown) is actuated following each index to maintain the main shaft at that index location. When all four rivets have been set the preload clamping pneumatic cylinder 30 will be retracted raising the alignment and clamping assembly 32 to its elevated start position.

We claim:

1. Apparatus for setting blind rivets to fasten a laminate made up of an upper component and a lower component, with the component having holes which are to be coaxial so that a rivet can be passed therethrough prior to setting comprising vertically displaceable rivet setting tool means, nest means supported for rotation about a vertical axis for supporting the lower component of the laminate at a predetermined orientation, clamping means rotatable about a vertical axis and vertically displaceable from an elevated position to a lowered position engaging the top of the upper component, means for preventing the engagement of said clamping means and the top of the upper component unless said clamping means has a selected orientation relative to the upper component, means for verifying that a hole in the upper component is vertically coaxial with a hole in the lower component, signalling means for indicating operation of said verifying means, means for operating said clamping means to clamp the components together in said nest means when said clamp means is in engagement with the top of said upper components and after said verifying means verifies that said holes of said upper and lower components are in alignment, and said clamping means being selectively indexable to locate each of said aligned holes in the upper and lower components to a setting location where the component parts can be fastened together by said rivet setting tool.

2. Apparatus according to claim 1, wherein said alignment verification means comprises a pneumatic cylinder including an advanceable plunger selectively sized for insertion into a pair of aligned holes.

3. Apparatus according to claim 1, further comprising control means for operating said clamping means when said orientation and position verification means verifies said orientation and position and said alignment verification means verifies said alignment.

* * * * *